US012715469B2

(12) United States Patent
Münning et al.

(10) Patent No.: US 12,715,469 B2
(45) Date of Patent: Aug. 25, 2026

(54) METHOD FOR DETERMINING A TARGET TRAJECTORY FOR A MOTOR VEHICLE OPERATED IN AT LEAST SEMI-AUTOMATED FASHION ON A SINGLE-LANE ROAD, COMPUTER-READABLE MEDIUM, AND ASSISTANCE SYSTEM

(71) Applicants: Volkswagen Aktiengesellschaft, Wolfsburg (DE); Cariad SE, Wolfsburg (DE)

(72) Inventors: Daniel Münning, Braunschweig (DE); Ferdinand Farenholtz, Berlin (DE); Michael Stark, Berlin (DE); Thomas Strehlow, Braunschweig (DE)

(73) Assignees: VOLKSWAGEN AKTIENGESELLSCHAFT, Wolfsburg (DE); CARIAD SE, Wolfsburg (DE)

( * ) Notice: Subject to any disclaimer, the term of this patent is extended or adjusted under 35 U.S.C. 154(b) by 104 days.

(21) Appl. No.: 18/702,766

(22) PCT Filed: Oct. 18, 2022

(86) PCT No.: PCT/EP2022/078924

§ 371 (c)(1),
(2) Date: Apr. 18, 2024

(87) PCT Pub. No.: WO2023/066906

PCT Pub. Date: Apr. 27, 2023

(65) Prior Publication Data

US 2024/0409123 A1 Dec. 12, 2024

(30) Foreign Application Priority Data

Oct. 19, 2021 (DE) ..................... 10 2021 127 070.7

(51) Int. Cl.
*B60W 60/00* (2020.01)

(52) U.S. Cl.
CPC ....... *B60W 60/001* (2020.02); *B60W 2552/05* (2020.02); *B60W 2552/53* (2020.02)

(58) Field of Classification Search
CPC ........... B60W 60/001; B60W 2552/05; B60W 2552/53; B60W 2552/10; B60W 2552/30;
(Continued)

(56) References Cited

U.S. PATENT DOCUMENTS 10,369,990 B2 8/2019 Gussner et al.
10,466,056 B2 11/2019 Jiang et al.
(Continued)

FOREIGN PATENT DOCUMENTS

CN 110603181 B 12/2019
DE 102005052634 A1 5/2007
(Continued)

OTHER PUBLICATIONS

Armbrust, Machine translation of DE-102012011301-A1, Dec. 2013, espacenet.com (Year: 2013).*

*Primary Examiner* — David P. Merlino
(74) *Attorney, Agent, or Firm* — Seed Intellectual Property Law Group LLP

(57) ABSTRACT

The disclosure relates to a method for determining a target trajectory for a motor vehicle operated in at least semi-automated fashion on a single-lane road with potential oncoming traffic by way of an assistance system. The method includes: capturing surroundings of the motor vehicle with the single-lane road and with a lateral boundary marker of the single-lane road by way of a capture device of the assistance system; receiving swarm data about a trajectory that can potentially be taken on the single-lane road; determining the target trajectory by moving the trajectory (Continued)

that can potentially be taken by way of an electronic computing device of the assistance system in such a way that a predefined minimum distance from the lateral boundary marker is kept by way of the target trajectory. The disclosure also relates to a computer-readable medium and to an assistance system.

15 Claims, 3 Drawing Sheets

(58) Field of Classification Search
CPC ....... B60W 2530/201; B60W 2555/80; B60W 2556/05; B60W 2556/10; B60W 2556/45
See application file for complete search history.

(56) References Cited

U.S. PATENT DOCUMENTS 10,814,872 B2 10/2020 Sofra et al.
11,460,860 B2 10/2022 Max et al.
2012/0277957 A1 11/2012 Inoue et al.
2018/0088587 A1* 3/2018 Lee ...................... G05D 1/0274
2019/0283757 A1* 9/2019 Honda ................. G05D 1/0088
2019/0346845 A1 11/2019 Rottkamp
2020/0101979 A1 4/2020 Moshchuk et al.
2020/0377088 A1* 12/2020 Fukushige .......... B60W 40/105
2020/0377089 A1* 12/2020 Fukushige ............ B60W 30/12
2021/0078573 A1* 3/2021 Kashiwamura ... B60W 30/0956
2023/0003548 A1* 1/2023 Schwartz ............. G01C 21/367
2023/0159053 A1* 5/2023 Hershkovich ...... G01C 21/3889
701/25

FOREIGN PATENT DOCUMENTS

DE 102012208712 A1 11/2013
DE 102012011301 A1 * 12/2013 ........... B62D 15/025
DE 102015014651 A1 5/2017
DE 102016215825 A1 3/2018
DE 102016218876 A1 3/2018
DE 102016222782 A1 5/2018
DE 102017221932 A1 6/2019
DE 102018202712 A1 8/2019
DE 102019114725 A1 4/2020
DE 102021203484 B3 9/2022

* cited by examiner

METHOD FOR DETERMINING A TARGET TRAJECTORY FOR A MOTOR VEHICLE OPERATED IN AT LEAST SEMI-AUTOMATED FASHION ON A SINGLE-LANE ROAD, COMPUTER-READABLE MEDIUM, AND ASSISTANCE SYSTEM

BACKGROUND

Technical Field

Method for determining a target trajectory for a motor vehicle operated in at least semi-automated fashion on a single-lane road, computer-readable medium and assistance system

Description of the Related Art

The disclosure relates to a method for determining a target trajectory of a motor vehicle operated in at least partially automated manner on a single-lane roadway with potential oncoming traffic by way of an assistance system. Further, the disclosure relates to a computer-readable medium as well as to an assistance system.

From the prior art, transversely guiding assistance systems such as for example the so-called travel assist are already known, which are based on the fact that a capturing device, in particular a camera of the motor vehicle, recognizes live lanes and bases the control on the recognition thereof. In particular in situations, where lanes for example cannot be recognized, a transverse guidance can for example not be offered thereby.

U.S. Pat. No. 10,466,056 B2 describes a method for automatic determination of the shape of a path based on trajectory data from a set. Trajectory data is collected for a plurality of swarm data paths. The trajectory data for each of the plurality of swarm data paths is associated with at least one uniquely identifiable environmental signal. Anchor points can be identified, which correspond to a transition in a feature of the trajectory data of a single swarm data path. The comparison can be effected based on the analysis of coincidence patterns of anchor points and the evaluation of the coincidences. In various embodiments, a linked node structure is used to represent one or more lanes and/or to display routes in a certain geographic area.

According to US 2012/277957 A1, a driving assistance device captures the position of a vehicle in a direction of a width of a road in that it uses both distance data on the right and left side of the vehicle and road width data on the width of the road, specifics distance data with a temporally variable change equal to or greater than a predetermined threshold value from the distance data, which shows the captured vehicle position, to correct the vehicle position such that the vehicle position is shown by the distance data, from which the specified distance data is removed if the driving path of the vehicle shows a straight movement, determines the driving state of the vehicle in a temporally variable change of the corrected vehicle position, and reports a content corresponding to the determined driving state.

DE 10 2016 215 825 A1 relates to a method for externally providing map data, which is in particular specified with indications to roadway boundary characteristics, wherein the method is performed for a driving route section selected from a plurality of driving route sections with the steps that identifying static and dynamic objects associated with the selected driving route section from received environmental data of at least one reporting vehicle is effected such that a lateral distance to a longitudinal axis of the reporting vehicle capturing associated environmental data is determined for each identified static and dynamic object. Determining a roadway boundary characteristic of the selected driving route section depending on the distances of the identified static and dynamic objects in the selected driving route section is effected. Finally, externally providing map data updated with the roadway boundary characteristic of the selected driving route section is effected.

BRIEF SUMMARY

It is the object of the present disclosure to provide a method, a computer-readable medium as well as an assistance system, by way of which a target trajectory on a single-lane roadway with potential oncoming traffic can be determined in improved manner.

An aspect of the disclosure relates to a method for determining a target trajectory of a motor vehicle operated in at least partially automated manner on a single-lane roadway with potential oncoming traffic by way of an assistance system. Capturing an environment of the motor vehicle with the single-lane roadway and with a lateral boundary marker of the roadway by way of a capturing device of the assistance system is effected. Swarm data about a potentially drivable trajectory on the single-lane roadway is obtained. Then, determining the target trajectory by shifting the potentially drivable trajectory by way of an electronic computing device of the assistance system is effected such that a preset minimum distance to the boundary marker is complied with by the target trajectory.

In particular, it is thereby allowed that the motor vehicle thus for example does not drive centrally on a single-lane roadway with potential oncoming traffic, but performs the preset minimum distance to the potentially drivable trajectory.

In other words, it is provided that the potentially drivable trajectory is ascertained based on swarm data, in particular based on historic swarm data. Then, the boundary marker is used to shift the potentially drivable trajectory, which is based on information of the swarm data, such that only a minimum distance, in particular close to the boundary marker, is complied with. Thus, it can for example not be centrally driven on the single-lane roadway, but offset to the right in case of right-hand traffic, such that potential oncoming traffic also has enough space to pass the motor vehicle operated in at least partially automated manner on the single-lane roadway.

The swarm data can in particular be historic data of further motor vehicles, which have driven on the roadway in the past. Further, data of motor vehicles can also be used as the swarm data, which have only recently used this roadway. Therein, positions of the further motor vehicles are in particular captured and the corresponding drivable trajectory is then in turn determined based on the positions.

The motor vehicle operated in at least partially automated manner in particular comprises at least a transverse acceleration device and/or a longitudinal acceleration device, which can be controlled in partially automated manner.

Thus, an adaptation of the target trajectory individual for situation based on the swarm data in particular occurs. With the aid of the swarm data, the target trajectory is adapted in particular in so-called single-line situations of the live lane, which is captured by the camera, for example single-lane rural roads, in case of straight travel as well as in left and right turns, such that the motor vehicle is safely and comfortably guided, in particular as close to the live lane or the live boundary marker as possible.

In particular, the single-lane roadway with potential oncoming traffic can for example be determined based on map data. Further, the single-lane roadway with potential oncoming traffic can also be identified based on the swarm data. Furthermore, the single-lane roadway with potential oncoming traffic can also be determined based on live data, for example based on the capturing device. For example, if only one boundary marker is captured by the capturing device, for example the right boundary marker in case of right-hand traffic, the single-lane roadway can be recognized.

Therein, the potentially drivable trajectory can also be only indirectly implemented via a suitable virtual lane marker.

According to an advantageous form of configuration, the potentially drivable trajectory is checked for plausibility by way of the capturing device. Herein, the boundary markers can in particular be used to correspondingly check the target trajectory for plausibility. Only if the drivable trajectory was also made plausible, a shift to the target trajectory can be performed.

Further, it has proven advantageous if the minimum distance is preset depending on a radius of curvature of the single-lane roadway. In case of a lower radius of curvature, a lower distance to the boundary marker can for example be selected than in case of a large radius of curvature. Thereby, the sense of safety for an occupant of the motor vehicle can in particular be increased.

Further, it has proven advantageous if the minimum distance is preset depending on a direction of curvature of the single-lane roadway. For example, it can be provided that, in case of right-hand traffic, the motor vehicle is moved in slight right turns with a same minimum distance as in the straight travel. In narrower turns, the distance can for example be lower applied, such that the motor vehicle drives closer to the boundary marker. In left turns, a safety distance to the boundary marker could be selected larger than in right turns with respect to the comfort such that the motor vehicle does not traverse the turn at the outer edge. Of course, this is to be considered inversely in case of left-hand traffic.

In a further advantageous form of configuration, upon a transition from a two-lane roadway with potential oncoming traffic to the single-lane roadway with potential oncoming traffic, the adaptation of the current trajectory, which is currently traveled by the motor vehicle, to the determined target trajectory is performed after exceeding a minimum length of the single-lane roadway and/or after a minimum time of travel on the single-lane roadway. Hereby, it is allowed that a short-term non-recognition of boundary markers does for example not result in that fact that a change or an offset of the traveled trajectory is immediately performed. Only after exceeding the minimum distance or the minimum time of travel, this is performed such that the assistance system can surely assume that a change from the two-lane roadway to the single-lane roadway with potential oncoming traffic has occurred.

In a further advantageous form of configuration, a current traffic sense is taken into account in determining the target trajectory. For example in case of right-hand traffic, the drivable trajectory is in particular shifted to the target trajectory to the right boundary edge or boundary strip. If it should be left-hand traffic, thus, this is performed diametrically to the left boundary marker.

It is further advantageous if a vehicle width of the motor vehicle is taken into account in determining the target trajectory. Hereto, the vehicle width can in particular for example be stored in a storage device of the electronic computing device. By the vehicle width, it can be determined how far the drivable trajectory can be shifted to the target trajectory, and the minimum distance, in particular to a sidewall of the motor vehicle and the boundary strip, can be complied with at the same time. For example, a half vehicle width can be taken into account for offsetting the potentially drivable trajectory to the target trajectory. Thus, the target trajectory can be extremely reliably and comfortably determined.

In a further advantageous form of configuration, only a single boundary marker is captured. In particular, only the right boundary marker is captured in case of right-hand traffic. In case of left-hand traffic, only the left boundary marker is captured. Thereby, it is possible that the target trajectory can be reliably adjusted already with only one single captured boundary marker.

The presented method is in particular a computer-implemented method. Therefore, a further aspect of the disclosure relates to a computer-readable medium with program code, which cause an electronic computing device, when the program code are processed by the electronic computing device, to perform a method according to the preceding aspect.

Further, the disclosure also relates to an assistance system for determining a target trajectory of a motor vehicle operated in at least partially automated manner on a single-lane roadway with potential oncoming traffic, with at least one capturing device and with an electronic computing device, wherein the assistance system is formed for performing a method according to the preceding aspect. In particular, the method is performed by way of the assistance system. The assistance system can also be employed in a fully automated operation of the motor vehicle and for example also be referred to as supporting system for the fully automated operation.

Therein, the electronic computing device in particular for example comprises electronic components like processors, circuits, in particular integrated circuits, or further electronic components to be able to perform a corresponding method.

Further, the disclosure also relates to a motor vehicle with an assistance system according to the preceding aspect. Therein, the motor vehicle can be formed at least partially automated, in particular fully automated.

Advantageous forms of configuration of the method are to be regarded as advantageous forms of configuration of the computer-readable medium, of the assistance system as well as of the motor vehicle. Thereto, the assistance system as well as the motor vehicle comprise concrete features, which allow performing the method or an advantageous form of configuration thereof.

Developments of the assistance system according to the disclosure as well as of the motor vehicle, which comprise features, as they have already been described in context of the developments of the method according to the disclosure, also belong to the disclosure. For this reason, the corresponding developments of the assistance system and motor vehicle according to the disclosure are not again described here.

The disclosure also includes the combinations of the features of the described embodiments.

BRIEF DESCRIPTION OF THE SEVERAL VIEWS OF THE DRAWINGS

In the following, embodiments of the disclosure are described.

DETAILED DESCRIPTION

Figure 1:
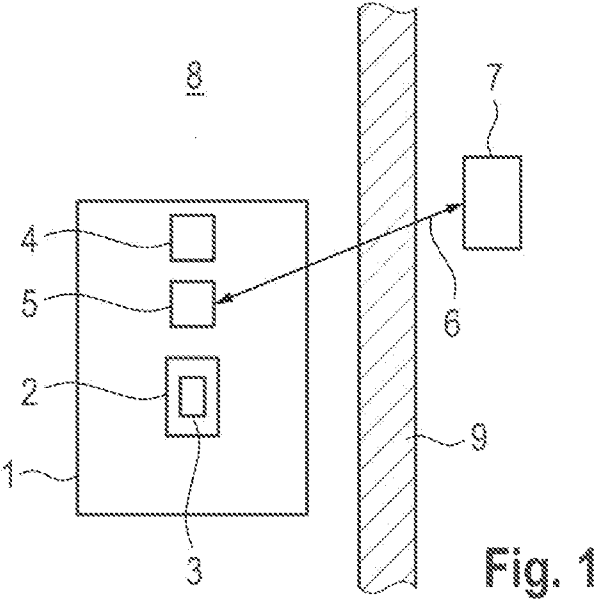
FIG. 1 shows a schematic top view to an embodiment of a motor vehicle with an embodiment of an assistance system.

The embodiments explained in the following are advantageous embodiments of the disclosure. In the embodiments, the described components each represent individual features of the disclosure to be considered independently of each other, which also each develop the disclosure independently of each other and thereby are also to be regarded as a constituent of the disclosure in individual manner or in a combination different from the shown one. Furthermore, the described embodiments can also be supplemented by further ones of the already described features of the disclosure.

In the figures, functionally identical elements are each provided with the same reference characters.

FIG. 1 shows a schematic top view of an embodiment of a motor vehicle 1 with an embodiment of an assistance system 2. In particular, the motor vehicle 1 is formed at least partially automated, alternatively also fully automated. The assistance system 2 comprises at least one electronic computing device 3 as well as a capturing device 4. The capturing device 4 can preferably be formed as a camera. Alternatively or additionally, the capturing device 4 can also be formed as an ultrasonic sensor device, radar sensor device and/or lidar sensor device. Further, the assistance system 2 preferably comprises a swarm data receiving device 5, which is formed for receiving swarm data 6 from an electronic computing device 7 external to motor vehicle. The swarm data 6 is in particular historically recorded data of further motor vehicles, which have already traveled the same roadway 8, on which the motor vehicle 1 is situated, in the past. The motor vehicle 1 further comprises in particular at least a longitudinal acceleration device and/or a transverse acceleration device, by way of which the driving state operated in at least partially assisted manner can be achieved by intervention of the assistance system 2.

FIG. 1 further shows that the roadway 8 is in particular a single-lane roadway, wherein the roadway 8 has potential oncoming traffic. In other words, the roadway 8 comprises only two boundary markers, presently only one, to define the roadway 8, wherein the roadway 8 is yet also opened to oncoming traffic. For example, such a roadway 8 can be corresponding single-lane rural roads.

By way of the capturing device 4, the roadway 8 as well as the boundary marker 9 can for example be captured.

Figure 2:
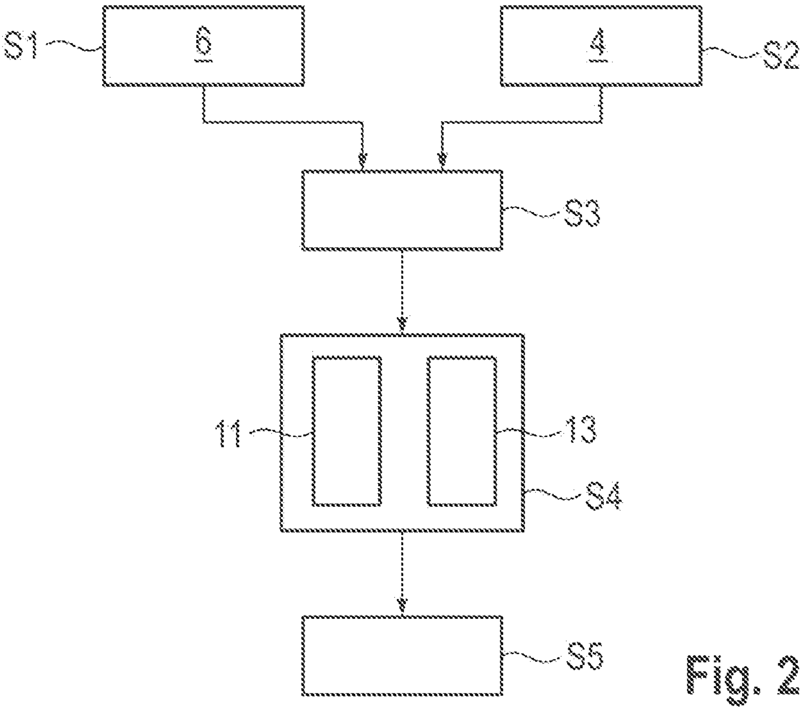
FIG. 2 shows a schematic flow diagram according to an embodiment of the method.

FIG. 2 shows a schematic flow diagram according to an embodiment of the method. In a first step S1, the swarm data 6 is received by the motor vehicle 1. In a second step S2, capturing the roadway 8 with the boundary marker 9 is effected. This can occur parallel in time or in reverse order. In a third step S3, the swarm data 6 is checked for plausibility by the capturing device 4. If the swarm data should for example be usable, thus, it is transitioned into a fourth step S4, wherein it is differentiated in a fourth step S4 if the roadway 8 is for example formed single-lane or two-lane. If the roadway should for example be two-lane and lane data or the boundary markers 9 should be present for both sides, thus, a target trajectory 10 (FIG. 3) can be centrally designed. Presently, this is in particular represented by the block 11. In contrast, it is provided in block 12 that the target trajectory 10 is realized by shifting. Hereto, it is in particular required that only the one boundary marker 9, presently in particular on the right side, is captured and a potentially drivable trajectory 12 (FIG. 3), which is generated based on the swarm data 6, is also present. Then, the shift of the drivable trajectory 12 to the target trajectory 10 is effected in a fifth step S5.

Figure 3:
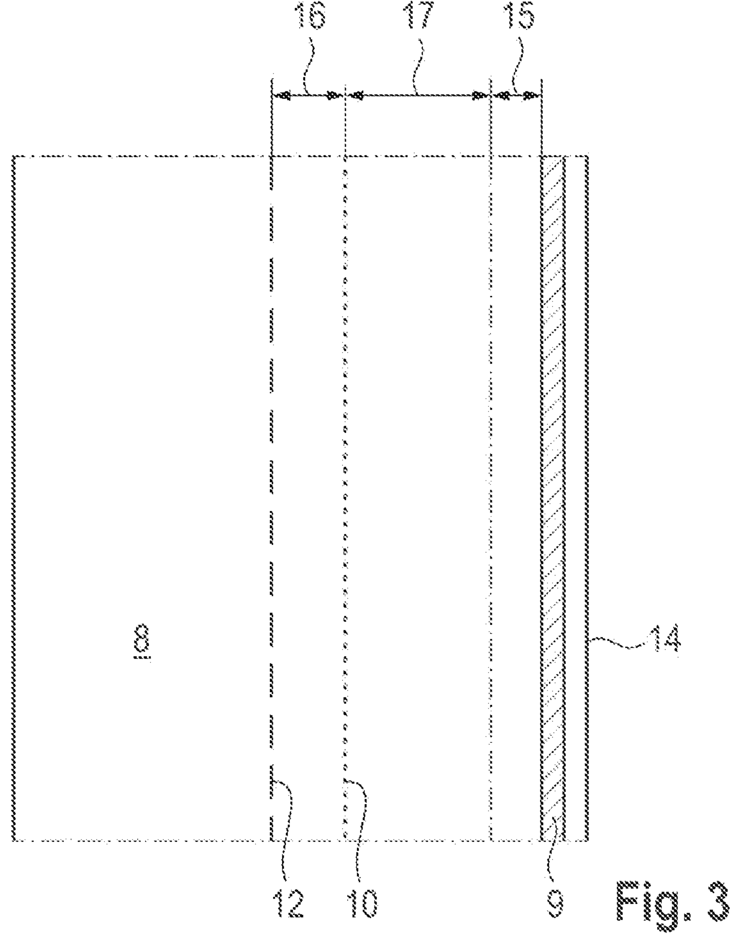
FIG. 3 shows a schematic perspective view to a single-lane roadway.

FIG. 3 shows a schematic top view to a single-lane roadway 8. Presently, it is in particular shown that the motor vehicle 1 not illustrated has obtained the drivable trajectory 10. Further, the motor vehicle 1 has obtained the boundary marker 9 by way of the capturing device 4. Furthermore, the boundary marker 9 can for example also have been obtained via the swarm data 6, which is presently represented by the line 14.

In the method for determining the target trajectory 10 on the single-lane roadway 8 with potential oncoming traffic, the motor vehicle 1 captures the environment with the single-lane roadway 8 and with the lateral boundary marker 9 by way of the assistance system 2. The swarm data 6 is obtained and the potentially drivable trajectory 12 on the single-lane roadway 8 is ascertained inside the motor vehicle or already received as the swarm data 6. Then, determining the target trajectory 10 by shifting the potentially drivable trajectory 12 is effected by way of the electronic computing device 3 such that a preset minimum distance 15 to the boundary marker 9 is complied with by the target trajectory. The shift of the drivable trajectory 12 to the target trajectory 10 is presently represented by the reference character 16.

In particular, it can be additionally provided that upon a transition from a two-lane roadway with potential oncoming traffic to the single-lane roadway 8 with oncoming traffic, the adaptation of the current trajectory to the determined target trajectory 10 is performed after exceeding a minimum length of the single-lane roadway 8 and/or after a minimum time of travel on the single-lane roadway 8.

Furthermore, it is in particular provided that a vehicle width 17, in particular at least the half vehicle width 17, of the motor vehicle 1 is taken into account in determining the target trajectory 10.

Thus, as presently shown, an evaluation of the route topology as straight travel in particular occurs, wherein this is performed with applicable characteristic parameters. Herein, the threshold value of a curvature of the roadway 8 can for example be used thereto. Then, the traffic direction is in turn taken into account based on signal information of the radar and/or the camera and/or the navigation and/or the swarm data 6 and/or on further information. In particular in the embodiment of the single-lane roadway 8 with potential oncoming traffic, the potentially drivable trajectory 12 is now set considering the vehicle width 17 such that the motor vehicle 1 drives with applicable distance to the corresponding boundary marker 9.

In particular, it is shown by the target trajectory 10 in FIG. 3 that it is located in the middle of the vehicle, while the minimum distance 15 is between the boundary marker 9 and a sidewall, in particular presently the right sidewall of the motor vehicle 1. Thus, the half vehicle width 17 is presently shown between the target trajectory 10 and the minimum distance 15.

Figure 4:
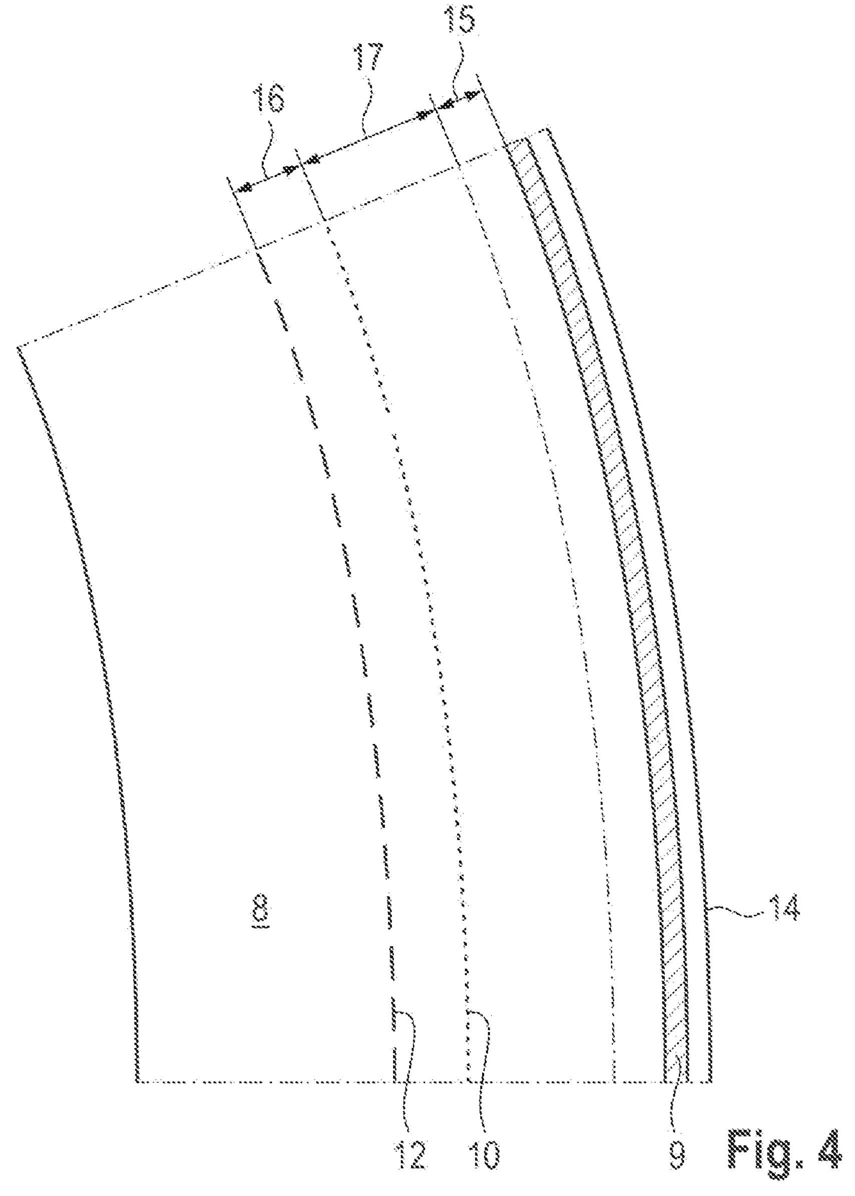
FIG. 4 shows a further schematic perspective view to a further single-lane roadway.

FIG. 4 shows a further schematic top view to a further embodiment of the roadway 8. In FIG. 4, a slight left turn of the roadway 8 is in particular shown. Now, it can in particular be provided that the minimum distance 15 is preset depending on a radius of curvature of the single-lane roadway 8. Further, the minimum distance 15 can also be preset depending on a direction of curvature, presently a curvature to the left, of the single-lane roadway 8.

Thus, it is in particular provided that the assistance system 2 identifies cornering for example based on the navigation device or further information. The drivable trajectory 12 is then set to the target trajectory 15 considering the vehicle width 17 such that the motor vehicle 1 drives with an applicable distance to the marker depending on the curvature and/or the direction of curvature. In an exemplary embodiment, the motor vehicle 1 can be moved in slight right turns with the same marker distance as in the straight travel in case of right-hand traffic. In narrower turns, the minimum distance 15 can be lower applied, such that the motor vehicle 1 drives closer to the boundary marker 9. In left turns, the distance to the boundary marker 9 could be selected larger than in right turns with respect to the comfort and safety, such that the motor vehicle 1 does not traverse the turn on the outermost edge. This behavior can of course be mirrored in changing traffic sense.

German patent application no. 10 2021 127 070.7, filed Oct. 19, 2021, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for determining a target trajectory of a motor vehicle operated in at least partially automated manner on a single-lane roadway with potential oncoming traffic by way of an assistance system, the method comprising:
- capturing an environment of the motor vehicle with the single-lane roadway and with a lateral boundary marker of the single-lane roadway by way of a capturing device of the assistance system;
- obtaining swarm data about a potentially drivable trajectory on the single-lane roadway;
- determining the target trajectory by shifting the potentially drivable trajectory by way of an electronic computing device of the assistance system such that a preset minimum distance to the lateral boundary marker is complied with by the target trajectory;
- in response to determining that the motor vehicle transitions from a two-lane roadway with potential oncoming traffic to the single-lane roadway with potential oncoming traffic, adapting a current trajectory to the target trajectory after exceeding a minimum length of the single-lane roadway and/or after a minimum time of travel on the single-lane roadway; and
- driving the motor vehicle in at least partially automated manner based on the target trajectory by way of the electronic computing device of the assistance system.

2. The method according to claim 1, further comprising:
- checking the potentially drivable trajectory for plausibility by way of the capturing device.

3. The method according to claim 1, wherein the preset minimum distance is preset based on a radius of curvature of the single-lane roadway.

4. The method according to claim 1, wherein the preset minimum distance is preset based on a direction of curvature of the single-lane roadway.

5. The method according to claim 1, wherein the target trajectory is determined based on current traffic.

6. The method according to claim 1, wherein the target trajectory is determined based on a vehicle width of the motor vehicle.

7. The method according to claim 1, wherein only a single boundary marker is captured.

8. The method according to claim 1, further comprising:
- setting the minimum distance differently while the motor vehicle travels on the single-lane roadway and while the motor vehicle travels on the two-lane roadway.

9. The method according to claim 8, wherein the minimum distance is set such that the motor vehicle drives centrally on the two-lane roadway and the motor vehicle drives offset to one side of the single-lane roadway.

10. A non-transitory computer-readable medium storing program code that, when processed by an electronic computing device, causes the electronic computing device to:
- capture an environment of a motor vehicle with a single-lane roadway and with a lateral boundary marker of the single-lane roadway by way of a capturing device of an assistance system;
- obtain swarm data about a potentially drivable trajectory on the single-lane roadway;
- determine a target trajectory by shifting the potentially drivable trajectory such that a preset minimum distance to the lateral boundary marker is complied with by the target trajectory;
- in response to determining that the motor vehicle transitions from a two-lane roadway with potential oncoming traffic to the single-lane roadway with potential oncoming traffic, adapt a current trajectory to the target trajectory after exceeding a minimum length of the single-lane roadway and/or after a minimum time of travel on the single-lane roadway; and
- drive the motor vehicle based on the target trajectory in at least partially automated manner.

11. The non-transitory computer-readable medium according to claim 10, wherein the program code that, when processed by an electronic computing device, causes the electronic computing device to set the minimum distance differently while the motor vehicle travels on the single-lane roadway and while the motor vehicle travels on the two-lane roadway.

12. The non-transitory computer-readable medium according to claim 11, wherein the electronic computing device sets the minimum distance such that the motor vehicle drives centrally on the two-lane roadway and the motor vehicle drives offset to one side of the single-lane roadway.

13. An assistance system for determining a target trajectory of a motor vehicle operated in at least partially automated manner on a single-lane roadway with potential oncoming traffic, the assistance system comprising:
- at least one capturing device;
- at least one processor; and
- a computer-readable medium storing program code that, when processed by the at least one processor, causes the assistance system to:
  - capture an environment of the motor vehicle with the single-lane roadway and with a lateral boundary marker of the single-lane roadway by way of the at least one capturing device;
  - obtain swarm data about a potentially drivable trajectory on the single-lane roadway;
  - determine the target trajectory by shifting the potentially drivable trajectory such that a preset minimum distance to the lateral boundary marker is complied with by the target trajectory;

in response to determining that the motor vehicle transitions from a two-lane roadway with potential oncoming traffic to the single-lane roadway with potential oncoming traffic, adapt a current trajectory to the target trajectory after exceeding a minimum length of the single-lane roadway and/or after a minimum time of travel on the single-lane roadway; and drive the motor vehicle based on the target trajectory in at least partially automated manner.

14. The assistance system according to claim 13, wherein the program code, when processed by the at least one processor, causes the assistance system to set the minimum distance differently while the motor vehicle travels on the single-lane roadway and while the motor vehicle travels on the two-lane roadway.

15. The assistance system according to claim 14, wherein the assistance system sets the minimum distance such that the motor vehicle drives centrally on the two-lane roadway and the motor vehicle drives offset to one side of the single-lane roadway.

* * * * *